(12) United States Patent
Doushita et al.

(10) Patent No.: US 8,745,436 B2
(45) Date of Patent: Jun. 3, 2014

(54) INFORMATION PROCESSING APPARATUS, INFORMATION PROCESSING SYSTEM, AND CONTROL METHOD THEREFOR

(75) Inventors: Akihiro Doushita, Kawasaki (JP); Yukinobu Nonomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 496 days.

(21) Appl. No.: 12/778,292

(22) Filed: May 12, 2010

(65) Prior Publication Data
US 2010/0229028 A1    Sep. 9, 2010

Related U.S. Application Data

(63) Continuation of application No. PCT/JP2007/001249, filed on Nov. 19, 2007.

(51) Int. Cl.
*G06F 11/00* (2006.01)

(52) U.S. Cl.
USPC ............... 714/4.11; 714/4.1; 714/11; 714/43

(58) Field of Classification Search
USPC ......... 714/2, 3, 4.1, 4.11, 10, 11, 43; 709/209
See application file for complete search history.

(56) References Cited

U.S. PATENT DOCUMENTS

| | | | |
|---|---|---|---|
| 6,681,282 B1 * | 1/2004 | Golden et al. | 710/302 |
| 7,945,773 B2 * | 5/2011 | Barabash et al. | 714/2 |
| 2004/0054765 A1 * | 3/2004 | Dwyer, III | 709/223 |
| 2004/0214576 A1 * | 10/2004 | Myers et al. | 455/445 |

FOREIGN PATENT DOCUMENTS

| | | |
|---|---|---|
| JP | 5-143564 | 6/1993 |
| JP | 6-52130 | 2/1994 |
| JP | 2001-22712 | 1/2001 |
| JP | 2004-220264 | 8/2004 |
| JP | 2005-267225 | 9/2005 |
| JP | 2006-146685 | 6/2006 |
| JP | 2006-228220 | 8/2006 |
| JP | 2006-268278 | 10/2006 |

OTHER PUBLICATIONS

English language International Search Report for PCT/JP2007/001249, mailed on Feb. 19, 2008.
Japanese Notice of Rejection Grounds dated Feb. 7, 2012 issued in corresponding Japanese Patent Application No. 2009-542401.
Decision of Rejection for Japanese Application No. 2009-542401; mailed Dec. 11, 2012.

* cited by examiner

*Primary Examiner* — Joseph D Manoskey
(74) *Attorney, Agent, or Firm* — Staas & Halsey LLP

(57) ABSTRACT

A computer unit includes computer components each having a processor and a computer component controller for controlling the operations of the computer components by communicating a control signal with the computer components through a radio transmission path. Another computer unit has a similar configuration. At an instruction from an external control terminal which has recognized the fault of another computer component controller provided for the another computer unit, the computer component controller concurrently controls the operations of computer components provided for the another computer unit by communicating a control signal through a radio transmission path.

21 Claims, 8 Drawing Sheets

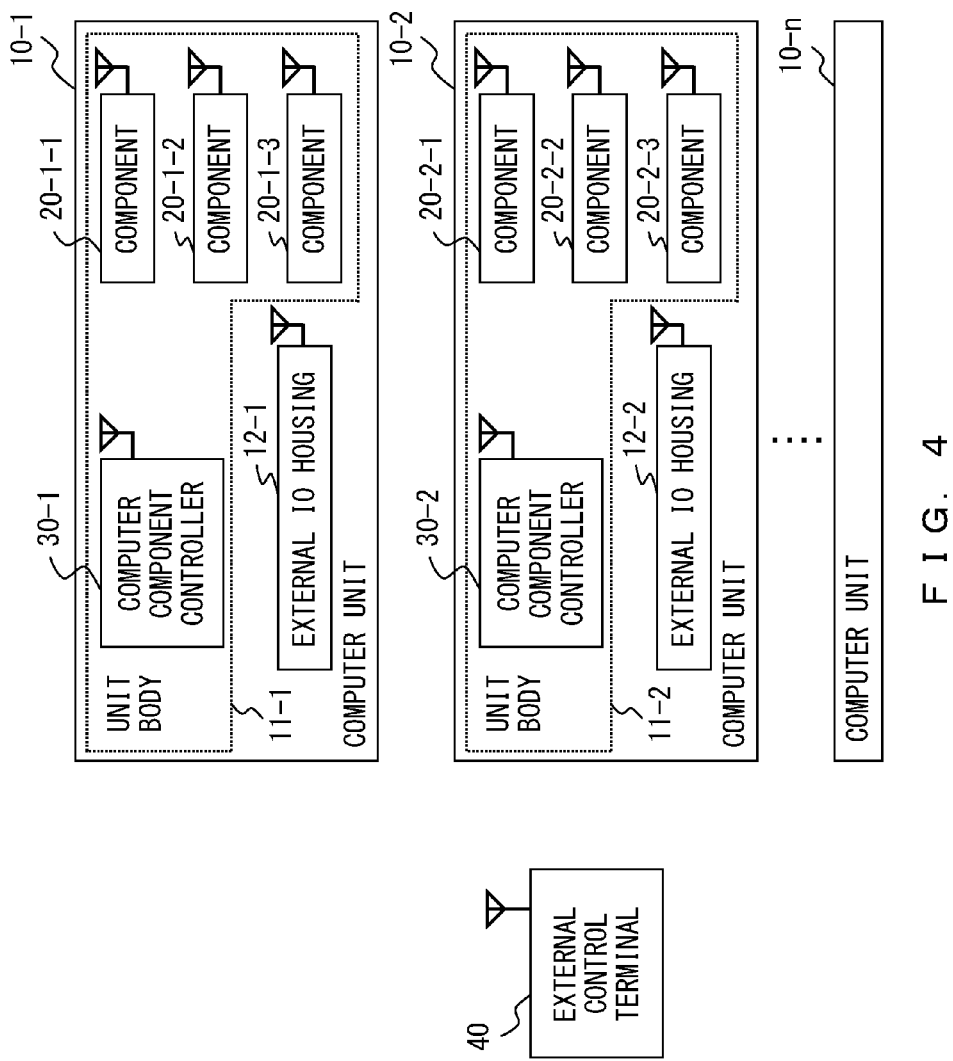
F I G. 4

INFORMATION PROCESSING APPARATUS, INFORMATION PROCESSING SYSTEM, AND CONTROL METHOD THEREFOR

CROSS-REFERENCE TO RELATED APPLICATION

This application is a continuation application of international PCT application No. PCT/JP2007/001249 filed on Nov. 19, 2007.

FIELD

An embodiment discussed herein is related to information processing apparatus, information processing system, and control method thereof.

BACKGROUND

FIG. 1 is an example of the entire configuration of a conventional information processing system. The information processing system is configured by computer units 100-1, 100-2, . . . , and 100-$n$ as a plurality of information processing apparatuses and an external control terminal 400.

The computer units 100-1, 100-2, . . . , and 100-$n$ provide various data processing functions under the control of the external control terminal 400. The external control terminal 400 has the function of issuing various instructions such as a data processing execute instruction, a setting instruction, a power-up instruction, etc. to the computer units 100-1, 100-2, . . . , and 100-$n$, and a function of holding error information transmitted from the computer units 100-1, 100-2, . . . , and 100-$n$.

The computer units 100-1, 100-2, . . . , and 100-$n$ may have different configurations but it is assumed in this specification that they have the same configurations. For simplicity, only the configuration of the computer unit 100-1 is described in this specification.

FIG. 2 is a detailed configuration of the computer unit 100-1.

The computer unit 100-1 is configured by a unit body 110, an extended housing 120, and an external IO (Input Output) housing 130.

The unit body 110 has a plurality of computer components 200-1, 200-2, 200-3, . . . as hardware resources, and is configured by a computer component controller 300 generally referred to as a SVP (service processor) as a system control device.

Each of the computer components 200-1, 200-2, 200-3, . . . has, for example, a processor, semiconductor memory, an IO, and various controllers to configure a computer, and may perform various arithmetic operations individually.

The computer component controller 300 controls the operations of the computer components 200-1, 200-2, 200-3, . . . under the management of the external control terminal 400. The computer component controller 300 is connected to the computer components 200-1, 200-2, 200-3, . . . by a bus connection formed by a printed circuit, a cable, etc. The computer component controller 300 is also wired through the external control terminal 400, a cable for a LAN (local area network), etc.

The extended housing 120 has as hardware resources a computer component 200-$n$ similar to the component provided for the unit body 110. In providing a data processing function by the computer unit 100-1, the extended housing 120 is connected to the unit body 110 as necessary when the hardware resources for data processing are running short only with the computer components 200-1, 200-2, 200-3, . . . provided for the unit body 110. The computer component 200-$n$ of the extended housing 120 is connected to the computer component controller 300 of the unit body 110 by a bus connection similar to that described above, and it operation is controlled by the computer component controller 300 under the management of the external control terminal 400.

The external IO housing 130 has as hardware resources an external storage device such as an extended RAID (Redundant Arrays of Inexpensive (Independent) Disks) disk device etc. and an external controller such as an extended PCI (Peripheral Component Interconnect) interface etc. When the external 10 housing 130 is connected to the unit body 110 via a cable etc., the operation of a component of the external 10 housing 130 is controlled by the computer component controller 300 under the management of the external control terminal 400.

In the computer unit 100-1, a plurality of operating systems are concurrently operated in one computer unit by individually configuring partitions 101-1, 101-2, . . . whose operating systems are independently operated. Each of the partitions 101-1, 101-2, . . . controls the respectively hardware resources of the computer unit 100-1 as necessary. In this case, the computer component controller 300 as a system control device controls the power supply, controls a resetting operation (initialization of hardware), dynamically changes the configuration (changes the control target by each partition), collects error information, monitors the environment, etc. on the hardware resources under the management of each partition.

The computer component controller 300 holds various setting information for the computer unit 100-1.

The external control terminal 400 illustrated in FIG. 1 controls the operations of the computer units 100-1, 100-2, . . . , and 100-$n$ having the above-mentioned configuration, and holds the individual information about the computer units 100-1, 100-2, . . . , and 100-$n$. Practically, for example, the terminal issues power-on (power-up), shutdown (power-off),and reboot (reactivate) instructions to hardware resources under the management of each partition, issues a division set instruction to each partition of each hardware resources of the computer units 100-1, 100-2, . . . , and 100-$n$, holds and displays an error log of each of the computer units 100-1, 100-2, . . . , and 100-$n$, performs display on a console for a human interface in each partition, acquires an instruction from an operator, holds specific setting information (same information as that held in the computer component controller 300) in each of the computer units 100-1, 100-2, . . . , and 100-$n$, etc.

In the information processing system illustrated in FIG. 1, for example, when the external control terminal 400 issues power-on, shut-down, and reboot instructions to the computer unit 100-1, the computer component controller 300 of the computer unit 100-1 performs the controlling operation in accordance with the instructions. In addition, when an error occurs in any hardware resources of the computer unit 100-1, the error information is transmitted to the external control terminal 400 through the computer component controller 300, and an error log is stored and displayed by the external control terminal 400.

For example, if the computer component controller 300 is replaced when a fault occurs in the computer component controller 300 provided for the computer unit 100-1, the setting information specific to the computer unit 100-1 held for backup by the external control terminal 400 is written to the new computer component controller 300 after the alternation.

By the way, it is preferable that an information processing system used in a basic system etc. is reliable enough to continue its operation by an alternating function although a hardware fault occurs, and replace faulty hardware (hot swap) without stopping the system.

However, in the configuration of the computer unit 100-1 in the conventional information processing system illustrated in FIG. 2, the connection between the computer components 200-1, 200-2, 200-3, and 200-*n* and the computer component controller 300 and the connection between the components of the external 10 housing 130 and the computer component controller 300 are made by cable. Therefore, when a fault occurs in the computer component controller 300, the controlling operations of the shutdown, the reboot, the dynamic configuration change, the collection, etc. of error information of the computer unit 100-1 are not performed. When the faulty computer component controller 300 is replaced, for example, all partitions 101-1, 101-2, . . . in the computer unit 100-1 are stopped with the power supply of the entire information processing system shut down.

For example, the above-mentioned problems may be solved by duplexing the computer component controller 300 for the computer unit 100-1. However, the duplexed computer component controller 300 complicates the configuration and increases the cost, and the problem of the fault of the selector unit required for the alternation of the duplexed computer component controller 300 is not solved.

Furthermore, related to the embodiment(s) discussed herein, for example, Japanese Laid-open Patent Publication No. 2005-267225 discloses the invention as the technology of controlling the input/output of a server device by connecting a control device for controlling the server device to a mobile terminal through a radio transmission path.

For example, Japanese Laid-open Patent Publication No. 2004-220264 discloses the invention of communicating data between the equipment configuration units built in a housing by wireless communication.

SUMMARY

In the information processing system according to an aspect of the embodiment having first and second information processing apparatuses, the first information processing apparatus includes a first processor that performs a process and a first system control device that controls the first processor through a radio transmission path, and the second information processing apparatus includes a second processor for performing a process and a second system control device that controls the second processor through a radio transmission path and controls the first processor through a radio transmission path based on a predetermined instruction.

The information processing apparatus according to another aspect of the embodiment is controlled by an information processing apparatus controller that controls another information processing apparatus having a first processor that performs a process and a first system control device that controls the first processor through a radio transmission path, and the information processing apparatus includes a second processor that performs a process and a second system control device that controls the second processor through a radio transmission path and controls the first processor through a radio transmission path based on a predetermined instruction.

A method for controlling an information processing system according to a further aspect of the present embodiment is a method for controlling an information processing system having a first information processing apparatus provided with a first processor and a second information processing apparatus provided with a second processor, and has a step of a first system control device of the first information processing apparatus controlling the first processor through a radio transmission path, a step of a second system control device of the second information processing apparatus controlling the second processor through a radio transmission path, and a step of the second system control device controlling the first processor through a radio transmission path based on a predetermined instruction.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a view of the configuration of the information processing system;

DESCRIPTION OF EMBODIMENTS

First, an operation of an information processing system is described with reference to FIG. 3.

Figure 1:
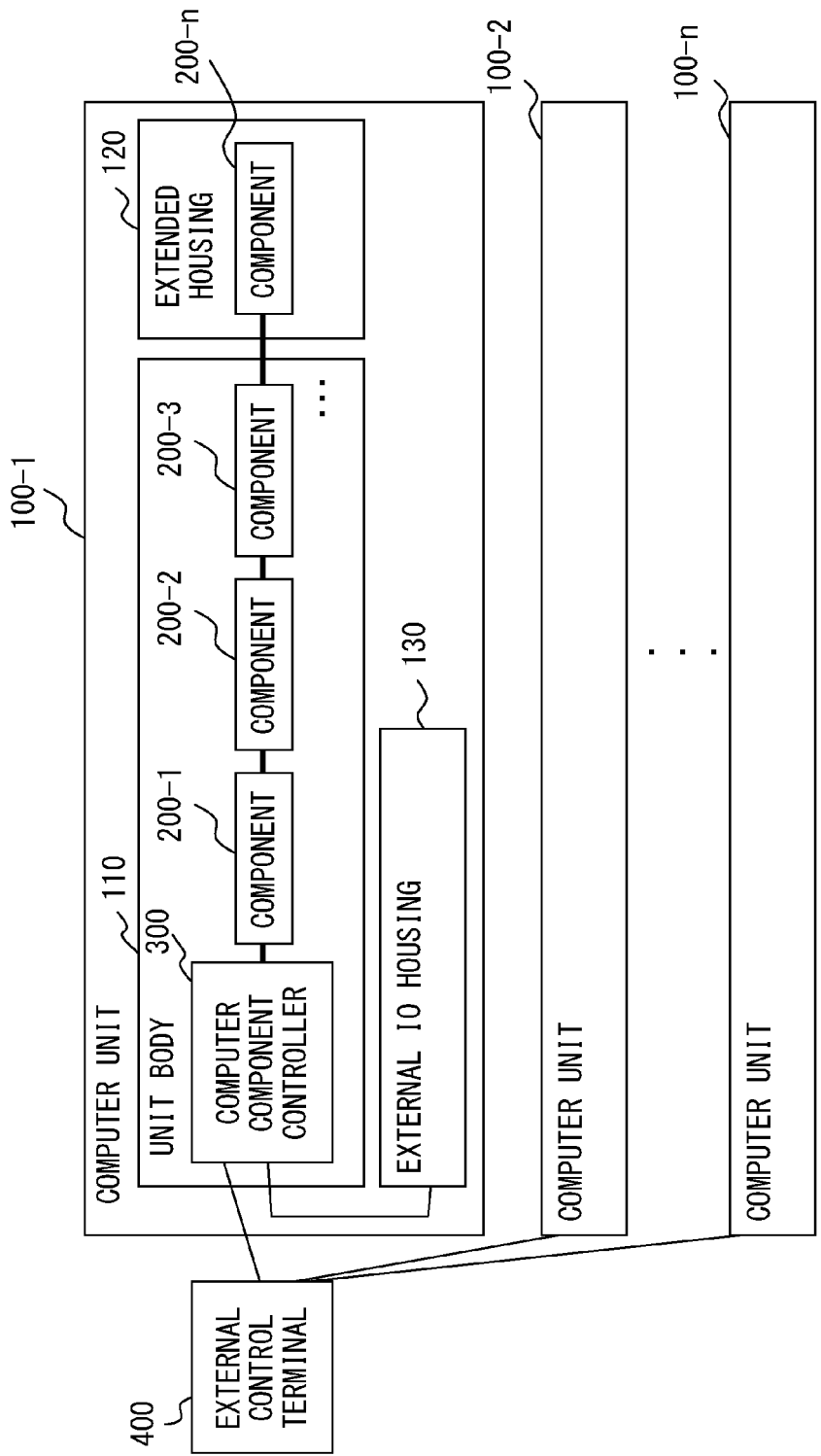
FIG. 1 is an example of the entire configuration of a conventional information processing system.
Figure 2:
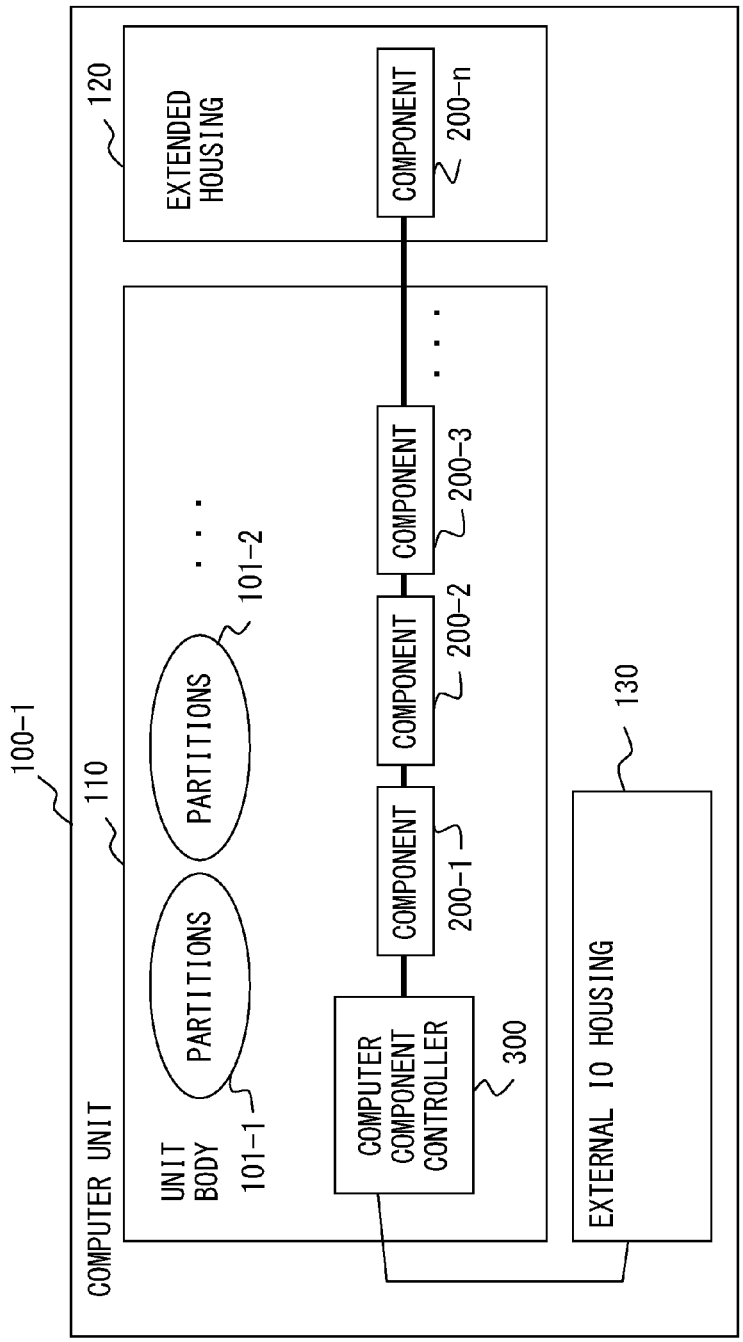
FIG. 2 is a detailed configuration of the computer unit illustrated in FIG. 1.
Figure 3:
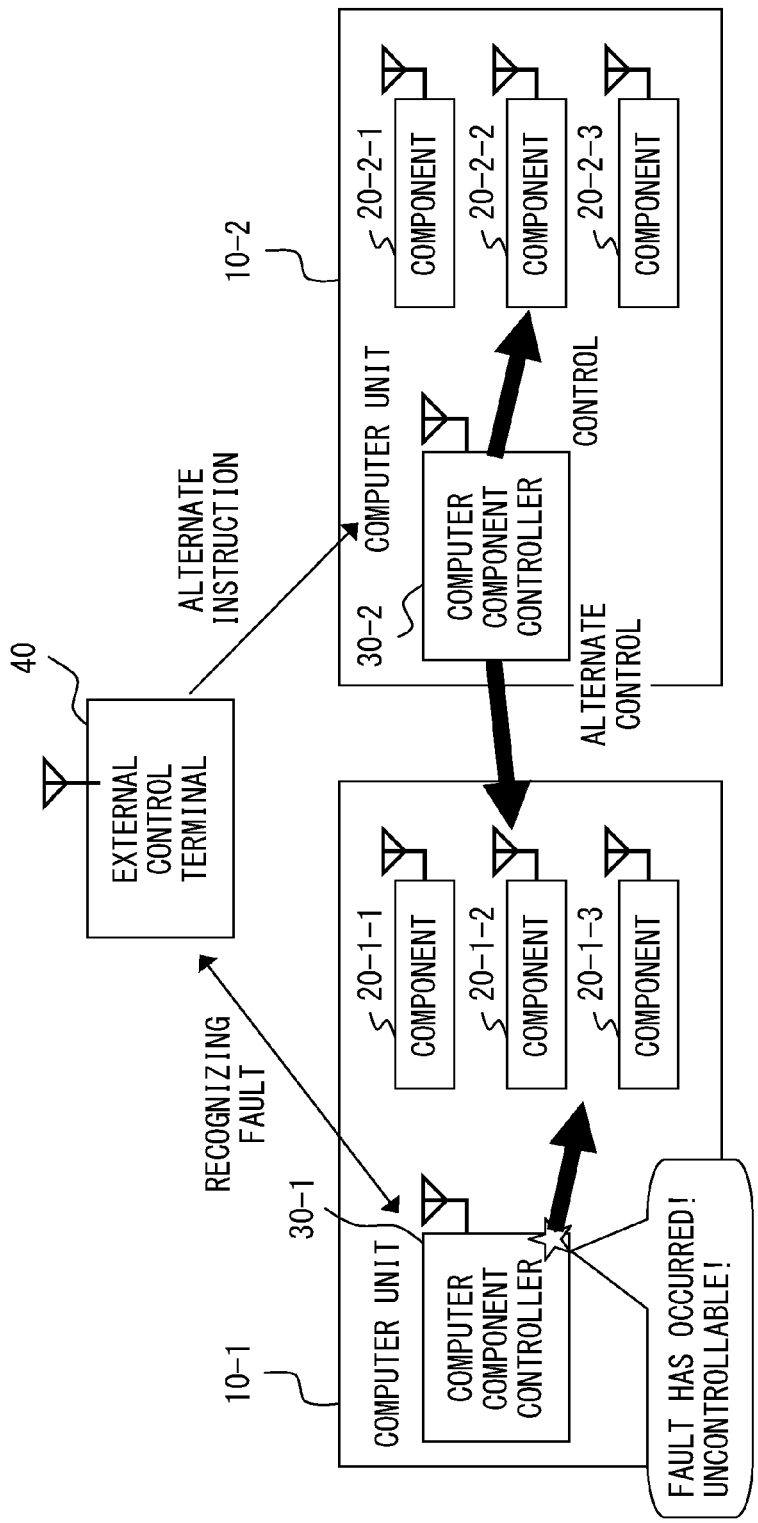
FIG. 3 is an explanatory view of an operation of an information processing system.

The information processing system illustrated in FIG. 3 is configured by computer units 10-1, 10-2, . . . as a plurality of information processing apparatuses, and an external control terminal 40. In this example, only the computer units 10-1 and 10-2 are illustrated for simplicity.

Each of the computer units 10-1, 10-2, . . . includes at least one or more computer components and a computer component controller as a system control device generally called a SVP (service processor). In FIG. 3, the computer unit 10-1 includes the computer components 20-1-1, 20-1-2, and 20-1-3 and the computer component controller 30-1, and the computer unit 10-2 includes the computer components 20-2-1, 20-2-2, and 20-2-3 and the computer component controller 30-2. Each of the computer units 10-1, 10-2, . . . may have a different or equal number of computer components.

Each of the computer components 20-1-1, 20-1-2, 20-1-3, 20-2-1, 20-2-2, and 20-2-3 may include, for example, a processor to configure an information processing apparatus so that various arithmetic processes may be performed individually.

The computer component controller 30-1 provided for the computer unit 10-1 performs the operation control of the computer components 20-1-1, 20-1-2, and 20-1-3 provided for the computer unit 10-1 in the normal state. Furthermore, the computer component controller 30-2 provided for the computer unit 10-2 performs the operation control of the computer components 20-2-1, 20-2-2, and 20-2-3 provided for the computer unit 10-2 in the normal state. The computer component controller 30-1 performs the operation control by communicating a control signal with the computer components 20-1-1, 20-1-2, and 20-1-3 through a radio transmission path, and the computer component controller 30-2 performs the operation control by communicating a control signal with the computer components 20-2-1, 20-2-2, and 20-2-3 through a radio transmission path.

The external control terminal 40 is a computer unit controller (information processing apparatus controller) for monitoring and controlling the operations of the computer units 10-1, 10-2, . . . by communicating various signals through a radio transmission path.

In FIG. 3, the external control terminal 40 has the function of issuing various instructions such as an execute instruction, a setting instruction, a power-on instruction, etc. for performing various data processing operations to the computer units 10-1 and 10-2, and the function of holding error information transmitted from the computer units 10-1 and 10-2. The external control terminal 40 issues various instructions to the computer units 10-1 and 10-2 by communicating various signals with the computer component controllers 30-1 and 30-2 through a radio transmission path, and receives error information from the computer units 10-1 and 10-2.

Assume that a fault occurs in the computer component controller 30-1, and the operation control of the computer components 20-1-1, 20-1-2, and 20-1-3 ceases in the information processing system illustrated in FIG. 3.

The external control terminal 40 in monitoring the operations of the computer units 10-1 and 10-2 recognizes an abnormal operation of the computer component controller 30-1 by the error information transmitted from the computer unit 10-1 through a radio transmission path, or by no response from the computer component controller 30-1. Then, the external control terminal 40 transmits a signal indicating a predetermined alternate instruction to the computer component controller 30-2 provided for the computer unit 10-2 through a radio transmission path.

Upon receipt of the signal indicating the predetermined alternate instruction through the radio transmission path, the computer component controller 30-2 performs the operation control of the computer components 20-1-1, 20-1-2, and 20-1-3 provided for a computer unit which does not include the computer component controller 30-2 between the computer units 10-1 and 10-2 in the information processing system illustrated in FIG. 3, that is, the computer unit 10-1, for the computer component controller 30-1 through the radio transmission path according to the alternate instruction indicated by the signal.

As described above, since the external control terminal 40 allows the computer component controller 30-2 to inherit the operation control of the computer components 20-1-1, 20-1-2, and 20-1-3 for the computer component controller 30-1 in the information processing system illustrated in FIG. 3, the operations of the computer components 20-1-1, 20-1-2, and 20-1-3 are continued. In addition, the computer component controller 30-1 performs the operation control of the computer components 20-1-1, 20-1-2, and 20-1-3 until the occurrence of the fault by communicating a control signal through the radio transmission path, and the computer component controller 30-2 also performs the operation control of the computer components 20-1-1, 20-1-2, and 20-1-3 by communicating a control signal through the radio transmission path for the faulty computer component controller 30-1. Therefore, the faulty computer component controller 30-1 is replaced without stopping the information processing system illustrated in FIG. 3.

FIG. 4 illustrates a configuration of the information processing system. In FIG. 4, the components also illustrated in FIG. 3 are assigned the same reference numerals.

The information processing system in FIG. 4 is configured by the computer units 10-1, 10-2, . . . , 10-n as a plurality of information processing apparatuses and the external control terminal 40.

Each of the computer units 10-1, 10-2, . . . , 10-n includes a unit body and an external IO housing. In FIG. 4, the configurations of only the computer units 10-1 and 10-2 are illustrated for simplicity. Only the configurations of the computer units 10-1 and 10-2 are described below.

The computer unit 10-1 is provided with a unit body 11-1 and an external 10 housing 12-1, and the computer unit 10-2 is provided with a unit body 11-2 and an external IO housing 12-2.

A unit body includes at least one or more computer components and a computer component controller as a system control device generally called a service processor (SVP). In FIG. 4, the unit body 11-1 of the computer unit 10-1 includes the computer components 20-1-1, 20-1-2, and 20-1-3 and the computer component controller 30-1. The unit body 11-2 of the computer unit 10-2 includes the computer components 20-2-1, 20-2-2, and 20-2-3 and the computer component controller 30-2. Each unit body of the computer units 10-1, 10-2, . . . , 10-n may have a different or equal number of computer components.

Each of the computer components 20-1-1, 20-1-2, 20-1-3, 20-2-1, 20-2-2, and 20-2-3 has a processor to configure an information processing apparatus, and various arithmetic processes may be performed individually.

The computer component controller 30-1 provided for the computer unit 10-1 as a system control device performs the operation control of the computer components 20-1-1, 20-1-2, and 20-1-3 provided for the computer unit 10-1 in the normal state. In addition, the computer component controller 30-2 provided for the computer unit 10-2 performs the operation control of the computer components 20-2-1, 20-2-2, and 20-2-3 provided for the computer unit 10-2 in the normal state. The computer component controller 30-1 performs the operation control by communicating a control signal with the computer components 20-1-1, 20-1-2, and 20-1-3 through a radio transmission path. The computer component controller 30-2 performs the operation control by communicating a control signal with the computer components 20-2-1, 20-2-2, and 20-2-3 through a radio transmission path.

Each of the external 10 housings 12-1 and 12-2 respectively provided for the computer units 10-1 and 10-2 has as a hardware resource an external storage device such as an extended RAID disk device etc. and an external controller etc. such as an extended PCI interface etc. The computer component controller 30-1 provided for the computer unit 10-1 performs the operation control of the external 10 housing 12-1 provided for the computer unit 10-1 by communicating a control signal with the external 10 housing 12-1 through a radio transmission path in the normal state. The computer component controller 30-2 provided for the computer unit 10-2 performs the operation control of the external 10 housing 12-2 provided for the computer unit 10-2 by communicating a control signal with the external 10 housing 12-2 through a radio transmission path in the normal state.

The external control terminal 40 is a computer unit controller (information processing apparatus controller) for monitoring and controlling the operations of the computer units 10-1, 10-2, ..., 10-*n* by communicating various signals through a radio transmission path.

In FIG. 4, the external control terminal 40 has the function of issuing various instructions such as an execute instruction, a set instruction, a power-up instruction, etc. for performing various data processing operations to the computer units 10-1, 10-2, ..., 10-*n*, and the function of holding error information transmitted from the computer units 10-1, 10-2, ..., 10-*n*. The external control terminal 40 issues various instructions to the computer units 10-1, 10-2, ..., 10-*n* by communicating various signals with the computer component controller provided for each of the computer units 10-1, 10-2, ..., 10-*n* through a radio transmission path, and receives error information from the computer units 10-1, 10-2, ..., 10-*n*.

The information processing system illustrated in FIG. 4 is configured as described above.

Further described below are the detailed configurations of the computer components 20-1-1, 20-1-2, 20-1-3, 20-2-1, 20-2-2, and 20-2-3, the computer component controllers 30-1 and 30-2, and the external control terminal 40.

Figure 5:
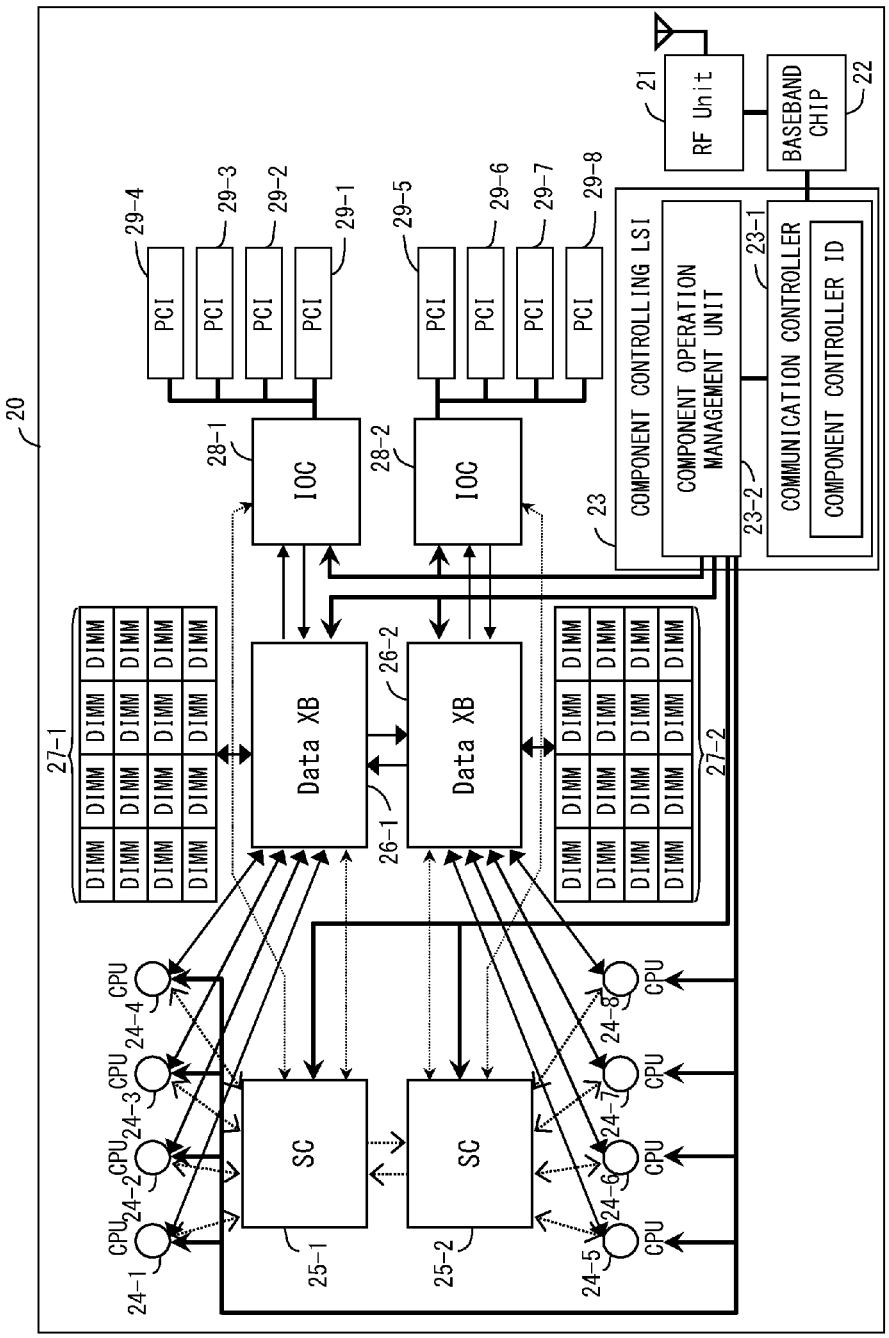
FIG. 5 is a detailed configuration of a system board.

FIG. 5 illustrates a detailed configuration of a system board 20. The system board 20 is used in each of the computer components 20-1-1, 20-1-2, 20-1-3, 20-2-1, 20-2-2, and 20-2-3 as processors in the information processing apparatus configuring the computer system illustrated in FIG. 4.

The system board 20 is configured by an RF (Radio Frequency) unit 21, a baseband chip 22, a component controlling LSI (Large Scale Integrated circuit) 23, CPUs (Central Processing Units) 24-1 through 24-8, system controllers 25-1 and 25-2, data cross bars 26-1 and 26-2, memory modules 27-1 and 27-2, I/O (Input Output) controllers 28-1 and 28-2, and PCI cards 29-1 through 29-8.

The RF unit 21 performs various signals with the computer component controller through a radio transmission path.

The baseband chip 22 modulates the digital data transmitted from the component controlling LSI 23, generates a transmission signal, and transmits the signal to the RF unit 21. It also demodulates the digital data from the received signal transmitted from the RF unit 21, and transmits the resultant signal to the component controlling LSI 23.

The component controlling LSI 23 corresponds to a so-called service processor, and is configured by a communication controller 23-1 and a component operation management unit 23-2.

The communication controller 23-1 controls the communicating operation of the RF unit 21 and the baseband chip 22, transmits various data received by the RF unit 21 and demodulated by the baseband chip 22 to the component operation management unit 23-2, modulates various data received from the component operation management unit 23-2 by the baseband chip 22, and makes the RF unit 21 transmit the resultant data.

The component operation management unit 23-2 manages and monitors the operations of the CPUs 24-1 through 24-8, the system controllers 25-1 and 25-2, the data crossbars 26-1 and 26-2, and the I/O controllers 28-1 and 28-2.

The CPUs 24-1 through 24-8 are processors for performing various data processing operations.

The system controllers 25-1 and 25-2 perform various data processing operations by performing the operation control of the CPUs 24-1 through 24-8, the data cross bars 26-1 and 26-2, and the I/O controllers 28-1 and 28-2 under the management of the component operation management unit 23-2, and monitor their operation states concurrently with the component operation management unit 23-2.

The data cross bars 26-1 and 26-2 exchange various data with the CPUs 24-1 through 24-8, the memory modules 27-1 and 27-2, and the I/O controllers 28-1 and 28-2 under the management of the component operation management unit 23-2 by the control of the system controllers 25-1 and 25-2.

The memory modules 27-1 and 27-2 belong to a semiconductor memory group, and storage units used for temporarily storing various data.

The I/O controllers 28-1 and 28-2 convert the data format between the data cross bars 26-1 and 26-2 and the PCI cards 29-1 through 29-8 under the control of the system controllers 25-1 and 25-2 to enable various data to be communicated.

The PCI cards 29-1 through 29-8 are implemented with a function expanding device or an interface control device for expanding the function or the interface of the system board 20 such as a network interface card etc.

In the system board 20 in FIG. 5, the storage unit of the communication controller 23-1 stores a component controller ID. The component controller ID is the information for uniquely identifying the computer component controller which is a destination of the communication by the RF unit 21. The communication controller 23-1 adds to a signal to be transmitted to the RF unit 21 the component controller ID as the destination information about the signal. The communication controller 23-1 transmits to the component operation management unit 23-2 the signal having the same component controller ID as the signal stored in the storage unit indicated as the destination information among the signals received by the RF unit 21. However, when the signal received by the RF unit 21 indicates a start notification of the alternate control, the communication controller 23-1 rewrites the storage information about the storage unit to a new component controller ID included as the destination information in the signal.

In addition to the above-mentioned component controller ID, the communication controller 23-1 also stores a computer component ID (not illustrated in the attached drawings) as the information for uniquely identifying the system board 20 as a computer component. The communication controller 23-1 adds to the signal to be transmitted to the RF unit 21 the computer component ID as a source of the signal. The communication controller 23-1 transmits to the component operation management unit 23-2 the signal having the same computer component ID as the signal stored in the storage unit indicated as a destination among the signals received by the RF unit 21.

As described above, the system board 20 as a computer component configures a processor, and may singly perform various arithmetic processes.

Figure 6:
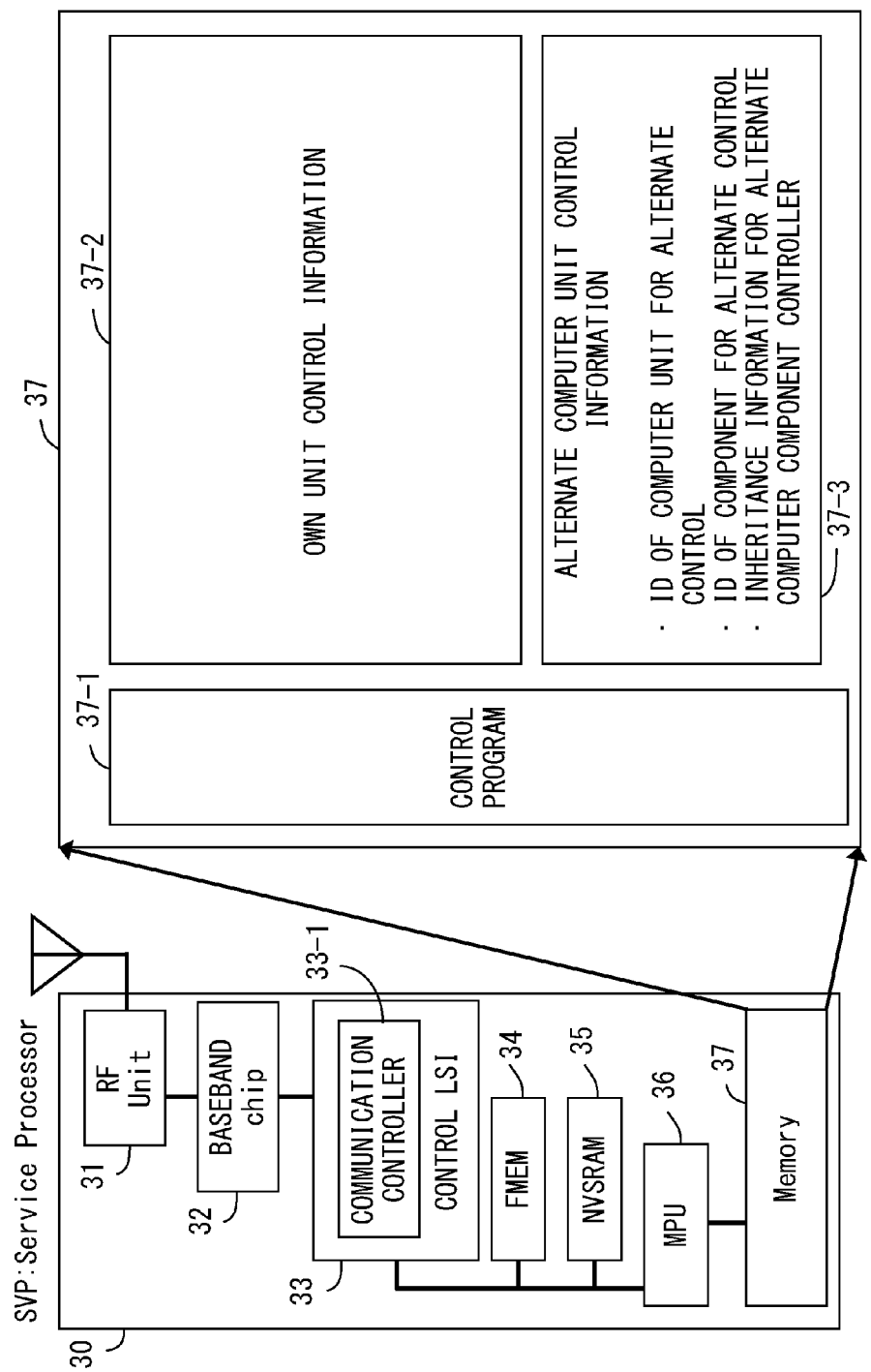
FIG. 6 is a detailed configuration of a service processor.

FIG. 6 illustrates a detailed configuration of an SVP (service processor) 30. The SVP 30 is used as the computer component controllers 30-1 and 30-2 as the system control devices in the information processing system illustrated in FIG. 4.

The SVP 30 is configured by an RF unit 31, a baseband chip 32, a control LSI 33, FMEM (Flash MEMory) 34, SRAM (Static Random Access Memory) 35, a MPU (Micro Processing Unit) 36, and semiconductor memory 37.

The RF unit 31 communicates various signals with each computer component as a processor and the external control terminal 40 through a radio transmission path.

The baseband chip 32 modulates the digital data transmitted from the control LSI 33 to generate a transmission signal, and transmits the generated signal to the RF unit 31. It also demodulates the digital data from the received signal from the RF unit 31, and transmits the demodulated data to the control LSI 33.

The control LSI 33 is configured by a communication controller 33-1. The communication controller 33-1 controls the communicating operation of the RF unit 31 and the baseband chip 32, transmits various data received by the RF unit 31 and demodulated by the baseband chip 32 to the MPU (micro-processing unit) 36 for controlling the SVP 30, modulates various data transmitted from the MPU 36 by the baseband chip 32, and makes the RF unit 31 transmit the modulation result.

The FMEM 34 stores a control program for operating the SVP. It is read from the MPU 36 and expanded in the semiconductor memory 37.

The NVSRAM 35 (non-volatile SRAM) is a non-volatile storage unit for storing various types of information required in performing a control process by the MPU 36, and also stores a specific component controller ID for identification of the SVP 30 as a computer component controller from others.

The MPU 36 monitors and controls the operation of each computer component by reading and executing the control program expanded in the semiconductor memory 37. The MPU 36 adds to various data to be transmitted to the control LSI 33 for transmission to the RF unit 31 the component controller ID held in the SRAM 35 as the source information about the signal. The MPU 36 also accepts as the data to the SVP 30 the data having the same component controller ID as the data stored in the SRAM 35 indicated as the destination information among the data transmitted from the control LSI 33.

As illustrated in FIG. 6, the semiconductor memory 37 has a storage area in which a control program 37-1 executed by the MPU 36 is expanded from the FMEM 34 and has a storage area of control information required by the SVP 30 to control a computer unit. In the control information stored in the storage area, own unit control information 37-2 is control information for the computer unit including the SVP 30 (referred to as an "own unit"), and alternate computer unit control information 37-3 is control information for the computer unit for which the SVP 30 alternately performs control (referred to as an "alternate unit").

The own unit control information 37-2 indicates the information about the computer unit ID of the computer unit of the own unit and the information about the operation state and the control state near the own unit such as the control state and the operation state of the reset of the own unit, the on/off state and the control state of the power supply of the own unit, a change of the configurations of a partition and hardware formed in the computer unit. The MPU 36 rewrites and updates the own unit control information 37-2 stored in the semiconductor memory 37 each time the information is changed.

The own unit control information 37-2 includes a computer unit ID of an alternate unit, a computer component ID of a computer component of alternate control, and the inheritance information from a replaced computer component controller from which the SVP 30 performs alternation of the control (that is, a replaced SVP). The computer unit ID is the information for unique identification of the computer units 10-1, 10-2, ..., 10-n provided for the information processing system illustrated in FIG. 4. To be more concrete, the inheritance information is own unit control information such as the initialization etc. in the replaced computer component controller (that is, the replaced SVP).

The SVP 30 is configured as described above, and communicates a control signal with a computer component through a radio transmission path, and performs operation control of the computer component by communicating the control signal.

Figure 7:
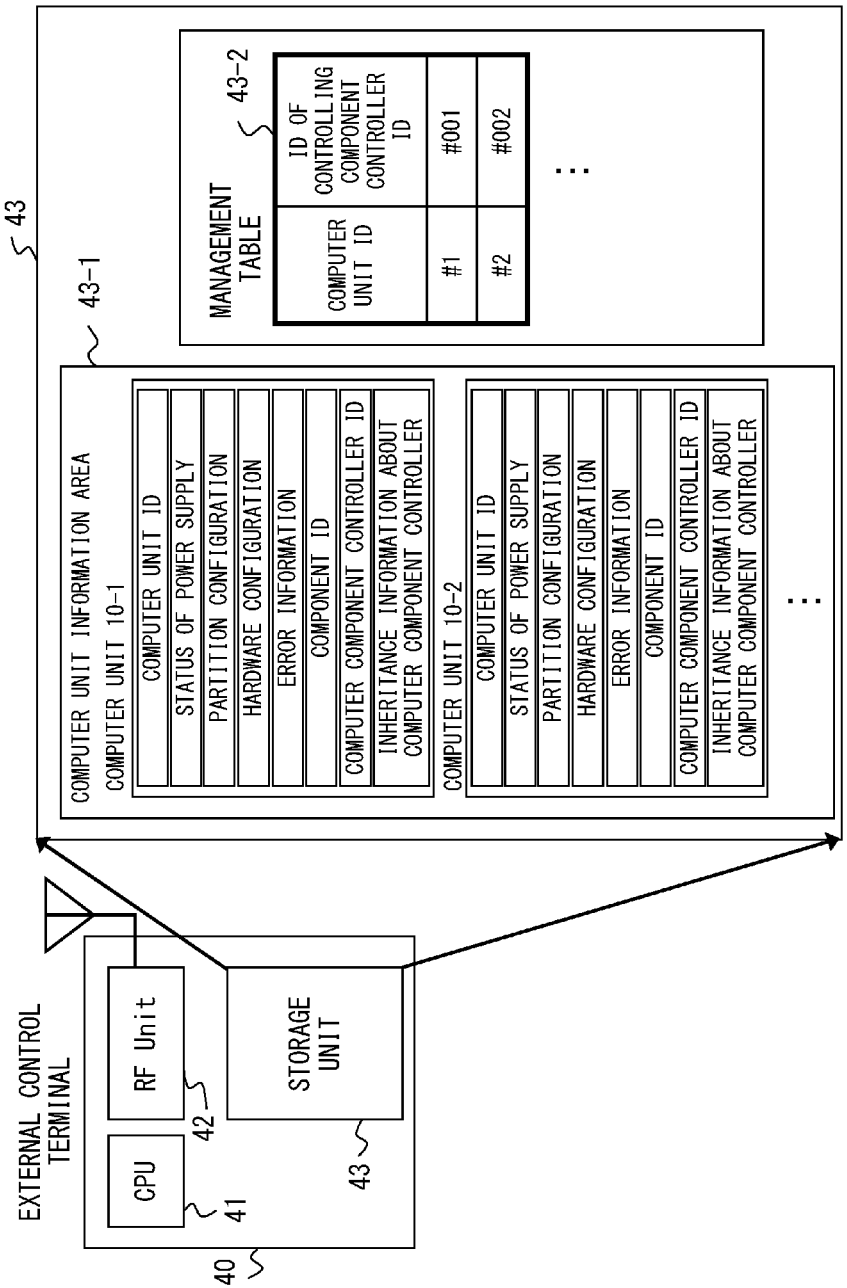
FIG. 7 is a detailed configuration of the external control terminal illustrated in FIG. 4.

FIG. 7 illustrates a detailed configuration of the external control terminal 40 illustrated in FIG. 4.

The external control terminal 40 is configured by a CPU 41, an RF unit 42, and a storage unit 43. The storage unit 43 is configured by, for example, a hard disk device or semiconductor memory. The external control terminal 40 may be configured by incorporating a PCI card having the RF unit 42 into a common work station provided with, for example, the CPU 41 and the storage unit 43.

The CPU 41 controls the operation of the entire external control terminal 40 by executing the control program not illustrated in the attached drawings but stored in the storage unit 43, thereby providing various functions of the external control terminal 40.

The RF unit 42 communicates various signals with the computer component controller as a system control device of each of the computer units 10-1, 10-2, ..., 10-n as information processing apparatuses through a radio transmission path.

The storage unit 43 stores the above-mentioned control program executed by the CPU 41, and also stores a management table 43-2 in its computer unit information area 43-1 illustrated in FIG. 7.

The computer unit information area 43-1 is a storage area for storing the management information about each computer unit. The management information is practically a computer unit ID of a computer unit, the on/off state of the power supply of a computer unit, the configuration of a partition formed in a computer unit, a hardware configuration of a computer unit, error information about a computer unit, a computer component ID of each computer component provided for a computer unit, a component controller ID of a computer component controller provided for a computer unit, the inheritance information for inheritance of control of each computer component by a computer component controller provided for the computer unit to others, etc.

The management table 43-2 indicates the relationship between a computer unit and a computer component controller for control of a computer component provided for the computer unit. In the management table 43-2, the left column stores a computer unit ID, and the right column stores a component controller ID of the computer component controller for controlling the computer component provided for the computer unit designated by the computer unit ID in the left column.

For example, the operator of the information processing system illustrated in FIG. 4 operates the external control terminal 40 and issues a partition setting instruction, a power-up instruction, a power-down instruction, etc., for each of the computer units 10-1, 10-2, ..., 10-n, the CPU 41 which is executing the control program first discriminates the setting information relating to the instructions for each of the computer units 10-1, 10-2, ..., 10-n, and stores the instruction in the computer unit information area 43-1. Next, the CPU 41 refers to the management table 43-2 of the storage unit 43 and designates the computer component controller for controlling the computer component of the computer unit to be processed by the corresponding instruction. Then, the CPU 41 performs wireless communication with the computer component controller designated by controlling the RF unit 42, and monitors and controls the operations of the computer units 10-1, 10-2, ..., 10-n.

When the RF unit 42 receives a signal indicating the information about the state change of a unit, error information, etc. from any of the computer units 10-1, 10-2, ..., 10-n, the CPU 41 recognizes from which of the computer units 10-1, 10-2, ..., 10-n the signal has been received according to the source computer component controller ID indicated by the received signal and the information about the management table 43-2, and updates the information stored in the computer unit information area 43-1 according to the information indicated by the received signal.

Figure 8:
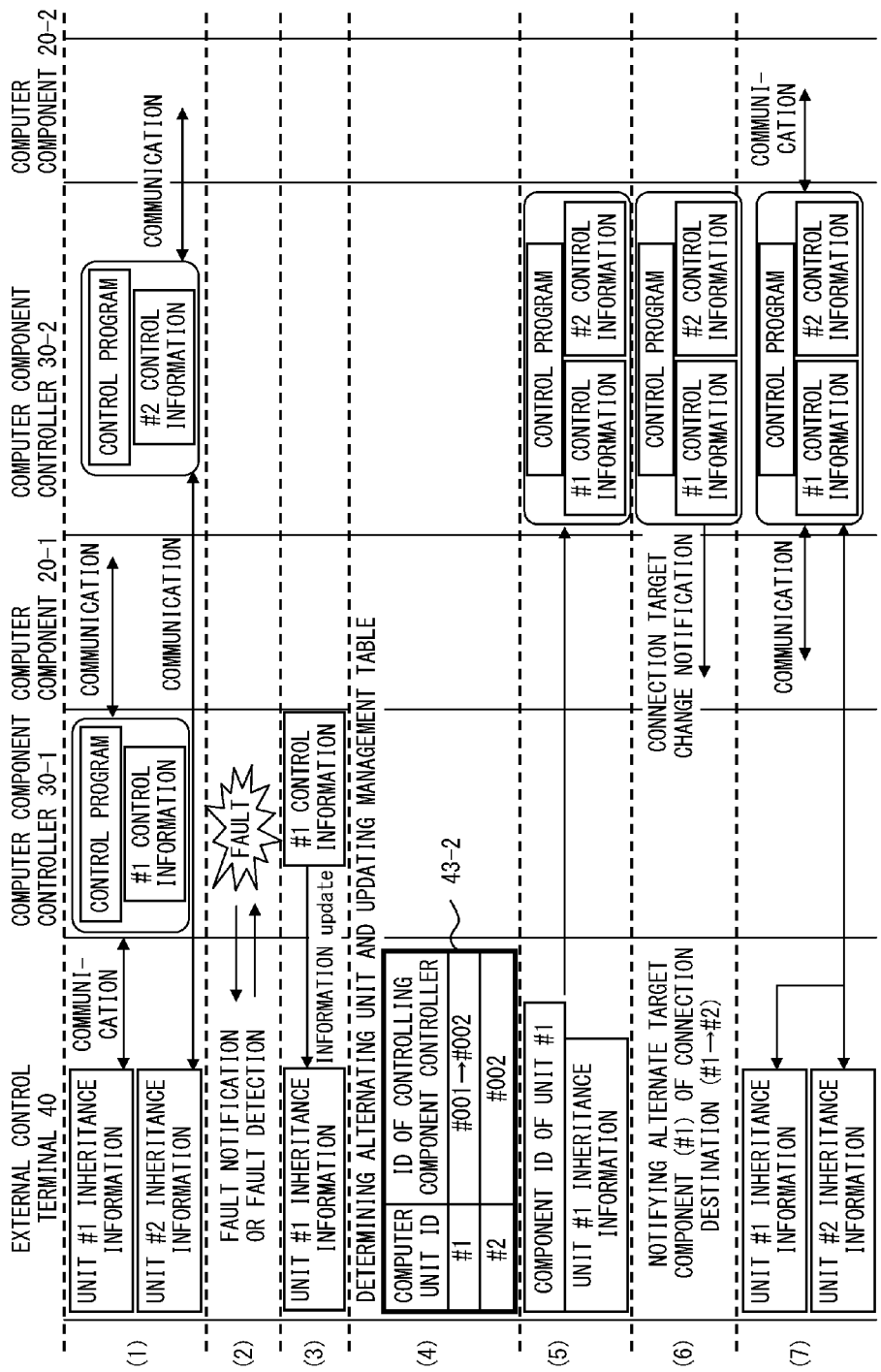
FIG. 8 is an example of the transition of the operation of the information processing system illustrated in FIG. 4 when a fault occurs in the computer component controller.

Next, the operation to be performed when a fault occurs in the computer component controller 30-1 provided for the computer unit 10-1 in the information processing system illustrated in FIG. 4 is described below with reference to FIG. 8. FIG. 8 is an example of the transition of the operation of the information processing system when the fault occurs in the computer component controller 30-1.

In the table illustrated in FIG. 8, a number enclosed in parentheses in the first left column indicates the order of state transition, the second column indicates the state of the external control terminal 40, the third column indicates the state of the computer component controller 30-1 as a system control device provided for the computer unit 10-1 as an information processing apparatus, and the fourth column indicates the state of the computer components 20-1-1, 20-1-2, and 20-1-3 (referred to as a "computer component 20-1" for simplicity) as processors provided for the computer unit 10-1. The fifth column indicates the state of the computer component controller 30-2 provided for the computer unit 10-2, and the sixth column indicates the state of the computer components 20-2-1, 20-2-2, and 20-2-3 (referred to as a "computer component 20-2" for simplicity) provided for the computer unit 10-2.

In FIG. 8, the state of (1) indicates the state in which the information processing system is normally operating.

In this state, the computer component controllers 30-1 and 30-2 respectively controlling the operations of the computer components 20-1 and 20-2 perform wireless communications with the external control terminal 40 to transmit the own unit control information 34-2 each time the own unit control information 34-2 of the semiconductor memory 34 of each controller is updated or periodically although no update is performed.

Upon receipt of the own unit control information 34-2 from the computer component controllers 30-1 and 30-2, the external control terminal 40 updates the management information about each of the computer units 10-1 and 10-2 stored in the computer unit information area 43-1 of the storage unit 43 according to the reception information. As a result, the received own unit control information 34-2 is backed up in the storage unit 43 of the external control terminal as the inheritance information for the inheritance of the control of the computer component provided for the own unit from the midcourse state.

Next, the state of (2) indicates the state in which a fault has occurred in the computer component controller 30-1.

The external control terminal 40 recognizes the fault by receiving the error information transmitted by the computer component controller 30-1, or by receiving no response to the signal transmitted to the computer component controller 30-1 from the external control terminal 40 for a predetermined time.

Next, the state of (3) indicates the state in which the backup of the latest own unit control information 34-2 stored in the computer component controller 30-1 is attempted.

Upon receipt of recognition of the occurrence of the fault of the computer component controller 30-1, the external control terminal 40 transmits to the computer component controller 30-1 a signal indicating the transmit request for the own unit control information 34-2 as inheritance information.

When the external control terminal 40 acquires the own unit control information 34-2 transmitted by the computer component controller 30-1 at the transmit request, the management information about the computer unit 10-1 stored in the computer unit information area 43-1 of the storage unit 43 is updated according to the acquisition information. As a result, the received own unit control information 34-2 is backed up in the storage unit 43 as the latest inheritance information for the inheritance of the control of the computer component 20-1 from the midcourse state, thereby effectively utilizing the process being pd by the computer component 20-1 immediately before the occurrence of the fault.

On the other hand, if the external control terminal 40 does not acquire the own unit control information 34-2 from the computer component controller 30-1, then the alternate control of the computer component 20-1 is performed using the inheritance information backed up in the storage unit 43 and received by the external control terminal 40 while the computer component controller 30-1 is normally functioning.

Next, the state of (4) indicates the state in which the external control terminal 40 determines that the alternate control of the computer component 20-1 is to be performed by the computer component controller 30-2.

In this case, the external control terminal 40 updates the management table 43-2 stored in the storage unit 43, and the control of the computer component 20-1 provided for the computer unit 10-1 (computer unit ID of "#1") is transferred from the computer component controller 30-1 (component controller ID of "#001") to the computer component controller 30-2 (component controller ID of "#002").

Next, the state of (5) indicates the state in which the external control terminal 40 instructs the computer component controller 30-2 to inherit the control of the computer component 20-1.

The external control terminal 40 first acquires the computer component ID of the computer component 20-1 which has been controlled by the computer component controller 30-1, the computer unit ID of the computer unit 10-1 provided with the computer component 20-1, and the inheritance information for inheritance of the operation control of the computer component 20-1 from the management information about the computer unit 10-1 stored in the computer unit information area 43-1 of the storage unit 43. Then, the inherit instruction signal including the acquired information is transmitted to the computer component controller 30-2.

Upon receipt of the inherit instruction signal, the computer component controller 30-2 stores the information included in the received signal as alternate computer unit control information 34-3 in the semiconductor memory 34.

The state of (6) is the state in which the computer component controller 30-2 notifies the computer component 20-1 of the start of the alternate control.

When the computer component controller 30-2 refers to the alternate computer unit control information 34-3 in the semiconductor memory 34 and acquires the computer component ID of the computer component 20-1, it defines the computer component ID as a destination and transmits the start notification signal of the alternate control including the component controller ID of the computer component controller 30-2 as a source to the computer component 20-1. Upon receipt of the start notification signal, the computer component 20-1 rewrites the component controller ID stored in the storage unit of a communication controller 24 to the component controller ID of the source included in the signal.

Finally, the state of (7) indicates the state in which the computer component controller 30-2 which has performed the operation control of only the computer component 20-2 has concurrently started the operation control of the computer component 20-1.

The operation control of both the computer components 20-1 and 20-2 is performed by the computer component controller 30-2 by the MPU 36 provided for the computer component controller 30-2 reading and executing a common control program 34-1 between the operation control of the computer component 20-1 and the operation control of the computer component 20-2 from the semiconductor memory 34.

In this state, the computer component controller 30-2 for performing the operation control of both the computer components 20-1 and 20-2 performs wireless communications with the external control terminal 40 and transmits the own unit control information 34-2 and the alternate computer unit control information 34-3 each time at least one of the own unit control information 34-2 and the alternate computer unit control information 34-3 of the semiconductor memory 34 is updated, or periodically although both of them are not updated.

Upon receipt of the own unit control information 34-2 and the alternate computer unit control information 34-3 from the computer component controller 30-2, the external control terminal 40 updates the management information about each of the computer units 10-1 and 10-2 stored in the computer unit information area 43-1 of the storage unit 43 according to the received information. As a result, the received own unit control information 34-2 is backed up in the storage unit 43 as the inheritance information for the inheritance of the control of the computer component provided for the computer unit 10-1. In addition, the received alternate computer unit control information 34-3 is backed up in the storage unit 43 as the inheritance information for the inheritance of the control of the computer component provided for the computer unit 10-2.

As described above, although a fault occurs in the computer component controller 30-1 as a system control device in the information processing system illustrated in FIG. 4, the computer component controller 30-2 for performing the operation control of the computer component 20-2 replaces the computer component 20-1 in performing the operation control. Therefore, the operation of the information processing system may be continued, and the faulty computer component controller 30-1 may be replaced without stopping the information processing system. Furthermore, since the operation controller of the computer component 20-1 is not duplexed, the present invention does not incur a complicated configuration or a cost increase.

A first aspect of the above described embodiment provides an information processing system having first and second information processing apparatuses, the first information processing apparatus includes a first processor that performs a process and a first system control device that controls the first processor through a radio transmission path, and the second information processing apparatus includes a second processor that performs a process and a second system control device that controls the second processor through a radio transmission path and controls the first processor through a radio transmission path based on a predetermined instruction.

According to the information processing system, although a fault occurs in the first system control device provided for the first information processing apparatus, the operation control of the first processor provided for the first information processing apparatus is performed by the alternating second system control device provided for the second information processing apparatus. Therefore, the operations of the information processing system are continued, and the faulty first system control device is replaced without stopping the information processing system. In addition, since the information processing system is not duplexed, it does not incur a complicated configuration or a cost increase.

A second aspect of the above described embodiment provides the information processing system according to the first aspect, wherein the information processing system may also be configured to include an information processing apparatus controller that allows the second system control device to inherit the control of the first processor by issuing the predetermined instruction to the second system control device.

With the configuration, when an abnormal operation occurs in the first system control device provided for the first information processing apparatus, the information processing apparatus controller recognizes the occurrence of the abnormal operation and issues a predetermined instruction to the second system control device, thereby allowing the second system control device provided for the second information processing apparatus to perform the operation control of the first processor provided for the first information processing apparatus.

A third aspect of the above described embodiment provides the information processing system according to the second aspect, wherein the information processing apparatus controller may also be configured to include a storage unit that stores information to control the first processor by the information processing apparatus controller.

With the configuration, when an abnormal operation occurs in the first system control device provided for the first information processing apparatus provided for the first information processing apparatus, the first processor for which the first system control device has performed the operation control is designated by the information processing apparatus controller.

A fourth aspect of the above described embodiment provides the information processing system according to the third aspect, wherein the information to control the first processor by the information processing apparatus controller may include at least one of a designation of the first processor, a designation of the first information processing apparatus, a designation of a system control device for control of the first processor, a power supply status of the first information processing apparatus, a configuration about hardware provided for the first information processing apparatus, an error information that has occurred in the first information processing apparatus, and the initialization information about the first information processing apparatus.

A fifth aspect of the above described embodiment provides the information processing system according to the third aspect, wherein the information processing apparatus controller may also be configured such that when the information processing apparatus controller issues the predetermined instruction, the designation of the first processor that has been controlled by the first system control device may be acquired from the storage unit, and may be provided for the second system control device with the predetermined instruction.

With the configuration, when an abnormal operation occurs in the first system control device provided for the first information processing apparatus, the second system control device which has received the instruction recognizes the first processor which is to alternately perform control.

A sixth aspect of the above described embodiment provides the information processing system according to the third aspect, wherein the information processing apparatus controller may also be configured such that when the predetermined instruction is issued to the second system control device, the information stored in the storage unit for designation of the system control device for controlling the first processor may be changed from the information for designation of the first system control device to the information for designation of the second system control device.

With the configuration, when an abnormal operation occurs in the first system control device provided for the first information processing apparatus, the information processing apparatus controller recognizes the relationship between the second system control device which is controlling the operation for the first system control device and the first processor to be controlled.

A seventh aspect of the above described embodiment provides the information processing system according to the second aspect, wherein the information processing apparatus controller may also be configured such that when an error occurs in the first system control device, the predetermined instruction may be issued to the second system control device.

With the configuration, when an abnormal operation occurs in the first system control device, the second system control device provided for the second information processing apparatus alternately performs the operation control of the first processor provided for the first information processing apparatus.

An eighth aspect of the above described embodiment provides the information processing system according to the second aspect, wherein the information processing apparatus controller may also be configured such that the operations of the first and second processors may be monitored and controlled through a radio transmission path.

With the configuration, since it is not necessary to wire the information processing apparatus controller to each of the first and second processors, the second information processing apparatus inherits the process of controlling the first processor without a physical connection change, and although the first processor becomes faulty, the first processor is replaced without stopping the power supply.

A ninth aspect of the above described embodiment provides an information processing apparatus controlled by an information processing apparatus controller that controls another information processing apparatus having a first processor that perform a process and a first system control device that controls the first processor through a radio transmission path, and the information processing apparatus includes a second processor that performs a process and a second system control device that controls the second processor through a radio transmission path and controls the first processor through a radio transmission path based on a predetermined instruction.

According to the information processing apparatus, the above-mentioned information processing system is configured by configuring an information processing system having the information processing apparatus and the another information processing apparatus.

A tenth aspect of the above described embodiment provides a controlling method of an information processing system having a first information processing apparatus provided with a first processor and a second information processing apparatus provided with a second processor, wherein the controlling method includes controlling the first processor by a first system control device included in the first information processing apparatus through a radio transmission path, controlling the second processor by a second system control device included in the second information processing apparatus through a radio transmission path, and controlling the first processor by the second system control device through a radio transmission path based on a predetermined instruction.

In the method above, although a fault occurs in the first system control device provided for the first information processing apparatus, the operation control of the first processor provided for the first information processing apparatus is performed by the alternating second system control device provided for the second information processing apparatus.

Therefore, the operations of the information processing system are continued, and the faulty first system control device is replaced without stopping the information processing system. In addition, since the information processing system is not duplexed, it does not incur a complicated configuration or a cost increase.

An eleventh aspect of the above described embodiment provides the controlling method according to the tenth aspect, wherein in the controlling the first processor by the second system control device through a radio transmission path based on the predetermined instruction, the second system control device may inherit the control of the first processor by an information processing apparatus controller that controls the first and second information processing apparatuses issuing the predetermined instruction to the second system control device.

In the method above, when an abnormal operation occurs in the first system control device provided for the first information processing apparatus, the information processing apparatus controller recognizes the occurrence of the abnormal operation and issues a predetermined instruction to the second system control device, thereby allowing the second system control device provided for the second information processing apparatus to perform the operation control of the first processor provided for the first information processing apparatus.

A twelfth aspect of the above described embodiment provides the controlling method according to the eleventh aspect, wherein the controlling method may also include storing the information to control the first processor in a storage unit included in the information processing apparatus controller by the information processing apparatus controller.

In the method above, when an abnormal operation occurs in the first system control device provided for the first information processing apparatus provided for the first information processing apparatus, the first processor for which the first system control device has performed the operation control is designated by the information processing apparatus controller.

A thirteenth aspect of the above described embodiment provides the controlling method according to the twelfth aspect, wherein the information processing apparatus controller may acquire from the storage unit a designation of a first processor which has been controlled by the first system control device when the predetermined instruction is issued, and issue the information with the predetermined instruction to the second system control device.

In the method above, when an abnormal operation occurs in the first system control device provided for the first information processing apparatus, the second system control device which has received the instruction recognizes the first processor which is to alternately perform control.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although an embodiment of the present invention has been described in detail, it should be understood that the various changes, substitutions, and alterations could be made hereto without departing from the spirit and scope of the invention.

What is claimed is:

1. An information processing system comprising:
first and second information processing apparatuses
wherein the first information processing apparatus comprises:
a first processor that performs a first process; and
a first system control device that controls an operation of the first processor in a normal state through a radio transmission path,
wherein the second information processing apparatus comprises:
a second processor that performs a second process; and
a second system control device that controls the operation of the second processor in the normal state through a radio transmission path,
wherein the second system control device controls the operation of the first processor when the second system control device receives a predetermined instruction that instructs the second system control device to inherit a control operation of a faulty first system control device, and
wherein each of the first process and the second process includes at least one of controlling power supply, initializing hardware and changing partition configuration.

2. The system according to claim 1, further comprising an information processing apparatus controller that allows the second system control device to inherit control of the first processor by issuing the predetermined instruction to the second system control device.

3. The system according to claim 2, wherein the information processing apparatus controller comprises a storage unit that stores information to control the first processor by the information processing apparatus controller.

4. The system according to claim 3, wherein the information to control the first processor by the information processing apparatus controller includes at least one of a designation of the first processor, a designation of the first information processing apparatus, a designation of a system control device for control of the first processor, a power supply status of the first information processing apparatus, a configuration about hardware provided for the first information processing apparatus, an error information that has occurred in the first information processing apparatus, and initialization information about the first information processing apparatus.

5. The system according to claim 3, wherein the information processing apparatus controller acquires the designation of the first processor that has been controlled by the first system control device from the storage unit when the predetermined instruction is issued, and provides the information for the second system control device together with the predetermined instruction.

6. The system according to claim 3, wherein the information processing apparatus controller changes the information stored in the storage unit for designation of the system control device for controlling the first processor from designation of the first system control device designation of the second system control device when the predetermined instruction is issued to the second system control device.

7. The system according to claim 2, wherein the information processing apparatus controller issues the predetermined instruction to the second system control device when an error occurs in the first system control device.

8. The system according to claim 2, wherein the information processing apparatus controller monitors and controls the operations of the first and second processors through a radio transmission path.

9. The system according to claim 1, wherein the second system control device is located within a range that allows for communication with the first processor and the second processor via a radio transmission path.

10. An information processing apparatus controlled by an information processing apparatus controller that controls another information processing apparatus having a first processor that performs a first process and a first system control device that controls an operation of the first processor in a normal state through a radio transmission path, the information processing apparatus comprising:
a second processor that performs a second process including at least one of controlling power supply, initializing hardware and changing partition configuration; and
a second system control device that controls the operation of the second processor in the normal state through a radio transmission path,
wherein the second system control device controls the operation of the first processor when the second system control device receives a predetermined instruction that instructs the second system control device to inherit a control operation of a faulty first system control device.

11. The information processing apparatus according to claim 10, wherein the information processing apparatus controller allows the second system control device to inherit control of the first processor by issuing the predetermined instruction to the second system control device.

12. The information processing apparatus according to claim 11, wherein the information processing apparatus controller comprises a storage unit that stores information to control the first processor by the information processing apparatus controller.

13. The apparatus according to claim 12, wherein the information to control the first processor by the information processing apparatus controller includes at least one of a designation of the first processor, a designation of the first information processing apparatus, a designation of a system control device for control of the first processor, a power supply status of the first information processing apparatus, a configuration about hardware provided for the first information processing apparatus, an error information that has occurred in the first information processing apparatus, and initialization information about the first information processing apparatus.

14. The apparatus according to claim 12, wherein the information processing apparatus controller acquires the designation of the first processor that has been controlled by the first system control device from the storage unit when the predetermined instruction is issued, and provides the information for the second system control device together with the predetermined instruction.

15. The apparatus according to claim 12, wherein the information processing apparatus controller changes the information stored in the storage unit for designation of the system control device for controlling the first processor from designation of the first system control device designation of the second system control device when the predetermined instruction is issued to the second system control device.

16. The apparatus according to claim 11, wherein the information processing apparatus controller issues the predetermined instruction to the second system control device when an error occurs in the first system control device.

17. The apparatus according to claim 11, wherein the information processing apparatus controller monitors and controls the operations of the first and second processors through a radio transmission path.

18. A controlling method of an information processing system having a first information processing apparatus provided with a first processor and a second information processing apparatus provided with a second processor, comprising:
  controlling an operation of the first processor in a normal state by a first system control device included in the first information processing apparatus through a radio transmission path;
  controlling the operation of the second processor in a normal state by a second system control device included in the second information processing apparatus through a radio transmission path; and
  controlling the operation of the first processor and the second processor by the second system control device when the second system control device receives a predetermined instruction that instructs the second system control device to inherit a control operation of a faulty first system control device,
  wherein each of the controlling by the first system control device and the controlling by the second system control device includes at least one of controlling power supply, initializing hardware and changing partition configuration.

19. The method according to claim 18, wherein in the controlling the first processor by the second system control device through a radio transmission path based on the predetermined instruction, the second system control device inherits the control of the first processor by an information processing apparatus controller that controls the first and second information processing apparatuses issuing the predetermined instruction to the second system control device.

20. The method according to claim 19, further comprising storing the information to control the first processor in a storage unit included in the information processing apparatus controller by the information processing apparatus controller.

21. The method according to claim 20, wherein the information processing apparatus controller acquires from the storage unit a designation of a first processor that has been controlled by the first system control device when the predetermined instruction is issued, and issues the information with the predetermined instruction to the second system control device.

* * * * *